US006092446A

United States Patent [19]

Hardesty

[11] Patent Number: 6,092,446

[45] Date of Patent: Jul. 25, 2000

[54] TAILSTOCK ASSEMBLY MOUNTABLE ON A MACHINE

[75] Inventor: Michael P. Hardesty, Dale, Ind.

[73] Assignee: Thermwood Corporation, Dale, Ind.

[21] Appl. No.: 09/252,280

[22] Filed: Feb. 18, 1999

Related U.S. Application Data

[62] Division of application No. 09/055,508, Apr. 6, 1998, Pat. No. 5,941,291.

[51] Int. Cl.[7] .............................. B23B 23/00; B27C 5/00

[52] U.S. Cl. ................................ 82/148; 82/150; 82/124; 142/3; 142/7; 144/48.1; 144/135.2; 144/144.1; 144/365

[58] Field of Search ................................ 279/4.12, 4.09, 279/51, 121, 123; 82/117, 124, 125, 142, 148, 1.11, 165, 149, 159; 142/2, 3, 7, 48, 53, 57; 144/47, 48.1, 134.1, 135.1, 48.3, 365; 409/158, 165, 166, 197, 199; 269/254.05

[56] References Cited

U.S. PATENT DOCUMENTS

| | | | |
|---|---|---|---|
| 3,222,992 | 12/1965 | Ettorre et al. | 409/165 |
| 3,599,998 | 8/1971 | Kiwalle | 279/51 |
| 3,739,824 | 6/1973 | Hoenig | 144/144.1 |
| 4,002,193 | 1/1977 | Schmidt | 144/144.1 |
| 4,033,210 | 7/1977 | Swenson | 82/150 |
| 4,082,018 | 4/1978 | Russell et al. | 82/124 |
| 4,219,974 | 9/1980 | Schmidt | 144/144.1 |
| 4,230,003 | 10/1980 | Oeming | 82/125 |
| 4,382,727 | 5/1983 | Schmidt | 144/144.1 |
| 4,616,538 | 10/1986 | Hessbruggen | 82/165 |
| 4,719,676 | 1/1988 | Sansone | 82/124 |
| 5,029,499 | 7/1991 | Okitsu | 82/124 |
| 5,547,003 | 8/1996 | Susnjara et al. | 144/367 |
| 5,562,134 | 10/1996 | Sato | 144/356 |

*Primary Examiner*—W. Donald Bray
*Attorney, Agent, or Firm*—Lalos & Keegan

[57] ABSTRACT

A tailstock assembly mountable on a machine tool and cooperable with a headstock assembly for retaining a workpiece inbetween.

14 Claims, 7 Drawing Sheets

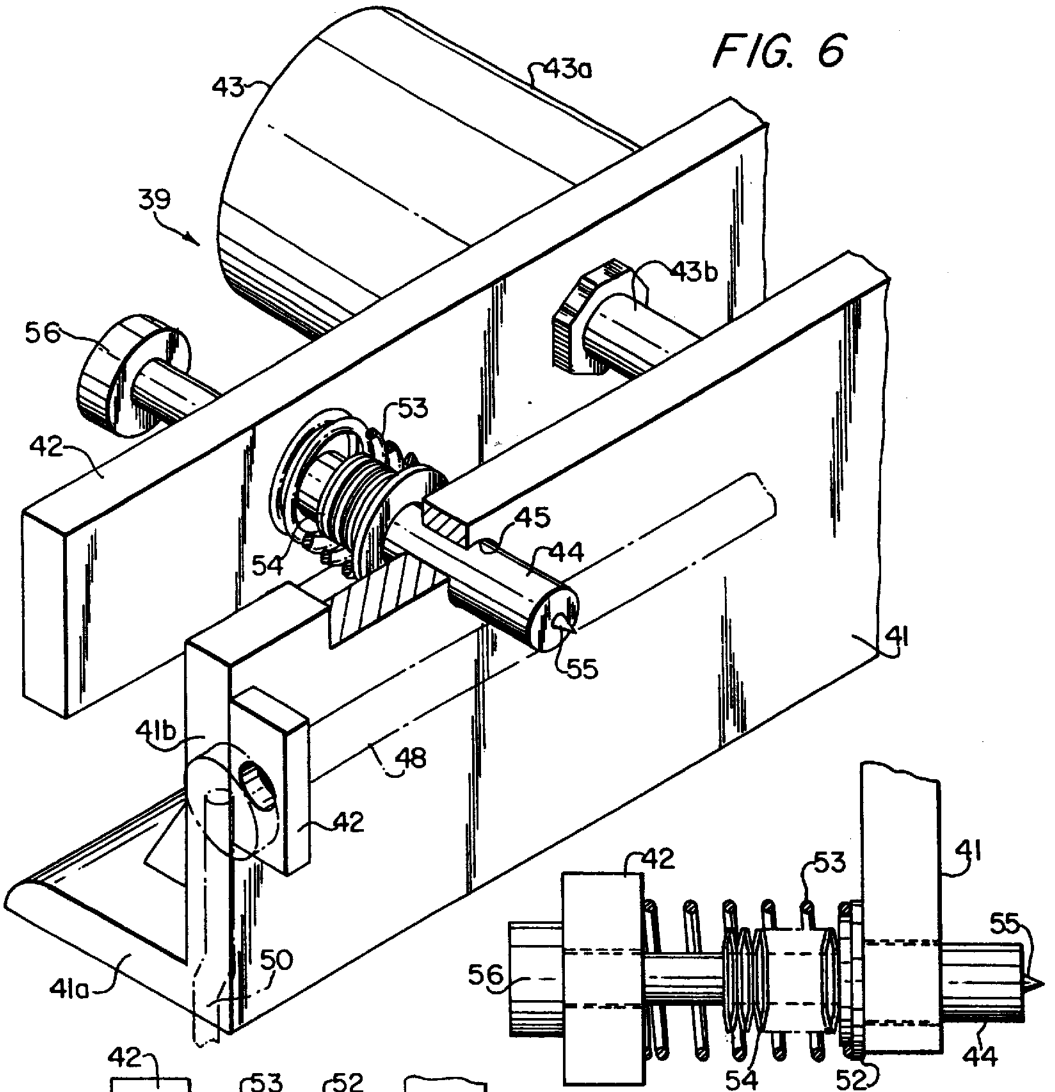
FIG. 6
FIG. 7A
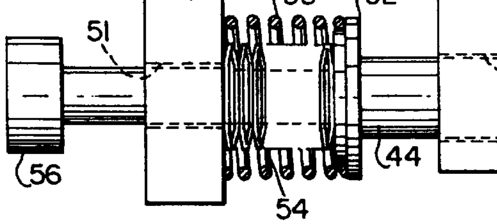
FIG. 7B
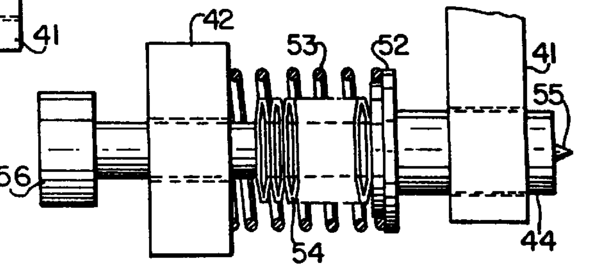
FIG. 7C
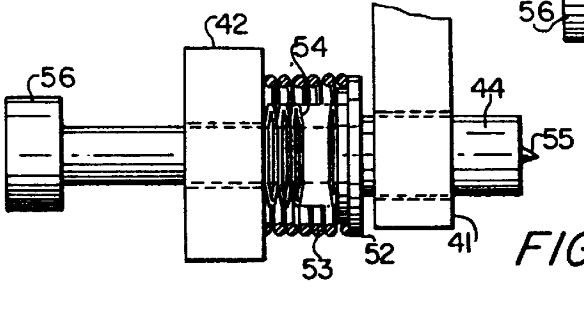
FIG. 7D

TAILSTOCK ASSEMBLY MOUNTABLE ON A MACHINE

This is a divisional application based on U.S. patent application Ser. No. 09/055,508, filed Mar. 4, 1998, which is now U.S. Pat. No. 5,941,291.

This invention relates to an improved machine for carving workpieces such as wooden furniture pieces and the like. This invention further contemplates a novel assembly for retaining and rotationally indexing workpieces loaded onto such a machine, an improved tailstock assembly for such a workpiece retaining assembly and further a novel means for such a retaining assembly for positioning sequential workpieces of similar configurations in a selected orientation for performing a working operation in accordance with a programmed sequence of motions of a tool such as a router bit.

BACKGROUND OF THE INVENTION

In the manufacture of certain furniture components such as table and chair legs, it has been the customary practice in the woodworking industry to rough cut pieces of wood in a certain configuration and then clamp such rough cut pieces between headstock and tailstock assemblies of a programmed CNC machine for carving a finished pattern on the pieces. In doing so, because of the programmed sequence of motions of the working tool of the machine, typically a router bit, it is preferable if not essential that the rough cut pieces sequentially loaded onto the machine not only be similarly configured but be oriented in the same position on the machine.

Typically, a solid piece of wood or possibly piece of wood made up of several pieces of wood glued together is rough cut to minimize the amount of carving by the machine. Such pieces generally are rough cut on a band saw to provide a pair of angularly displaced surfaces running the lengths thereof, usually 90° apart, which provide reference surfaces for the carving operation. To properly execute the carving operation on the machine, such rough cut workpieces must consistently be positioned in the same orientation.

It thus has been found to be desirable to provide a carving machine in which a plurality of similarly configured workpieces may be sequentially positioned in a selected orientation on the machine to accommodate a program of sequential motions of a working tool of the machine and thus provide a final component having a desired configuration.

SUMMARY OF THE INVENTION

The present invention provides for a carving machine having means for retaining an initial one of a sequence of similarly configured workpieces in a selected orientation on the machine, at least one jointed positioning means manipulatable to position a support member thereof into a support relationship with such an initial workpiece disposed in the selected orientation by such retaining means, means for fixing the interrelationship of the components of the jointed positioning means when the support member thereof is positioned in the support relationship with the initial workpiece to place the positioning means in an operative condition, means for displacing the positioning means when in the operative condition between an operative position for supporting subsequent workpieces in the selected orientation and an inoperative position.

The machine on which the retaining means is mounted is provided with a base member provided with either a stationary table and a gantry displaceable longitudinally or along an x-axis relative to the base member, or a movable table displaceable along the x-axis and a stationary gantry. A tool assembly is mounted on the gantry, displaceable transversely or along a y-axis relative to the base member, having a tool displaceable vertically or along a z-axis. The retaining means preferably includes tailstock and headstock assemblies for clamping the workpieces therebetween and rotatably indexing them, and means for displacing the headstock assembly relative to the tailstock assembly.

The tailstock assembly preferably includes a first plate supportable on the base member, a second plate displaceable relative to the first plate, means for displacing the second plate relative to the first plate and at least one spindle mounted on the second plate having an end portion displaceable with the second plate into and out of engagement with an end portion of a workpiece disposed between the headstock and tailstock assemblies.

The jointed positioning means preferably includes a first U-shaped member having a pin supported on the base member, received between leg portions thereof, a second U-shaped member having a pin portion of the support member, received between leg portions thereof and a threaded bolt extending through aligned openings in the leg portions of the U-shaped members, provided with a nut threaded onto an end of such bolt which may be brought to bear against an adjacent leg portion of one of the U-shaped members to draw the leg portions of the U-shaped members together to fix the interrelationship of the U-shaped members and pins of the assembly. The components of the positioning means are linked together with pivotal connections to form a swivel assembly which can be manipulated to position the support member thereof in a support relationship with an initial one of a number of similarly configured workpieces to be machined. Once the support member is positioned in support relationship with the initial workpiece positioned in the selected orientation the nut on the bolt passing through the aligned openings may be tightened to fix the components of the positioning means in the operative condition. The positioning means thus in the operative condition may be displaced between an operative position for supporting and thus positioning subsequent workpieces in the selected orientation and an inoperative position allowing the workpiece to rotationally index during the machining operation.

BRIEF DESCRIPTION OF THE DRAWINGS

FIG. 6 is an enlarged perspective view of the tailstock assembly shown in FIGS. 3 through 5, having a portion thereof broken away;

FIGS. 7*a* through 7*d* are sequential top plan views of the workpiece support spindle shown in FIG. 6;

DESCRIPTION OF THE PREFERRED EMBODIMENT OF THE INVENTION

Figure 9:
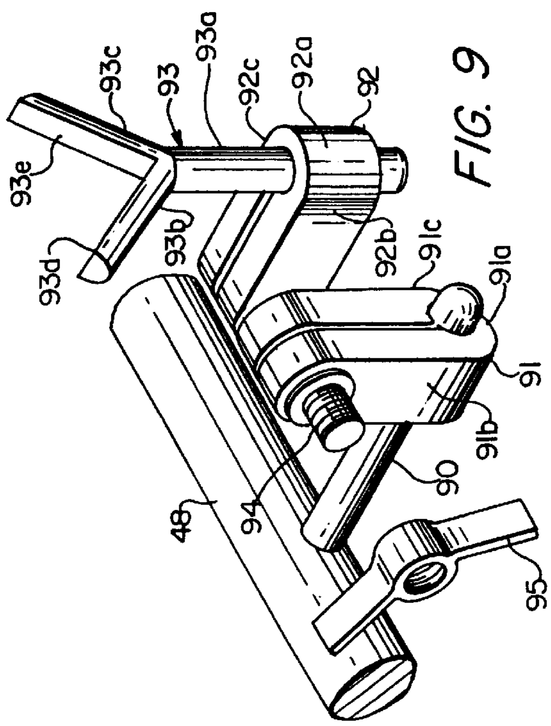
FIG. 9 is a perspective view of the workpiece positioning assembly shown in FIG. 8.
Figure 10:
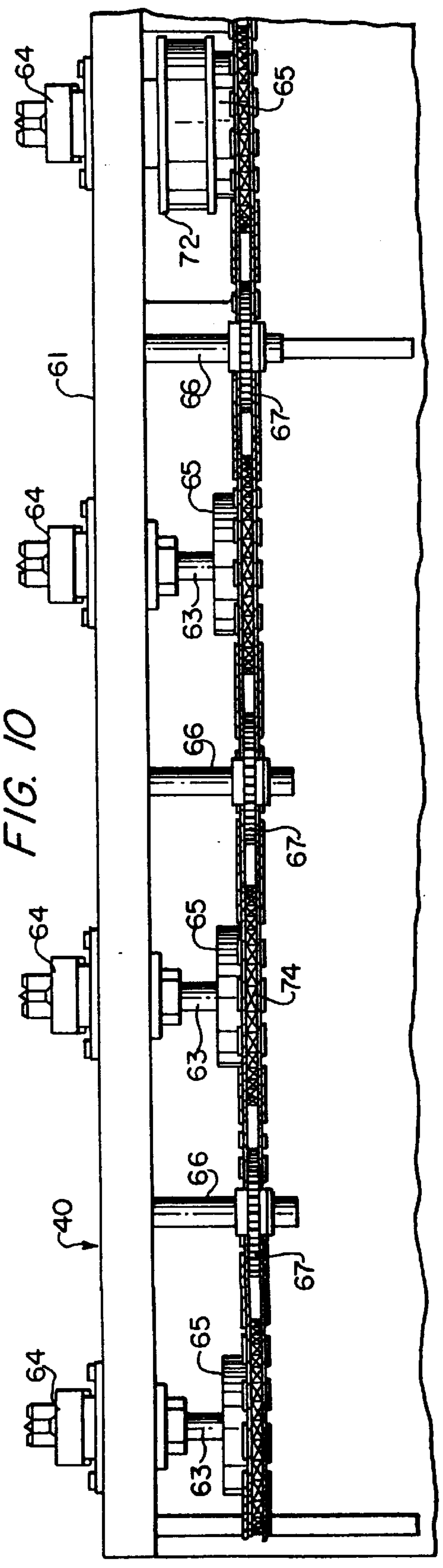
FIG. 10 is an enlarged cross-sectional view taken along line 10—10 in FIG. 3, having portions thereof broken away.
Figure 11:
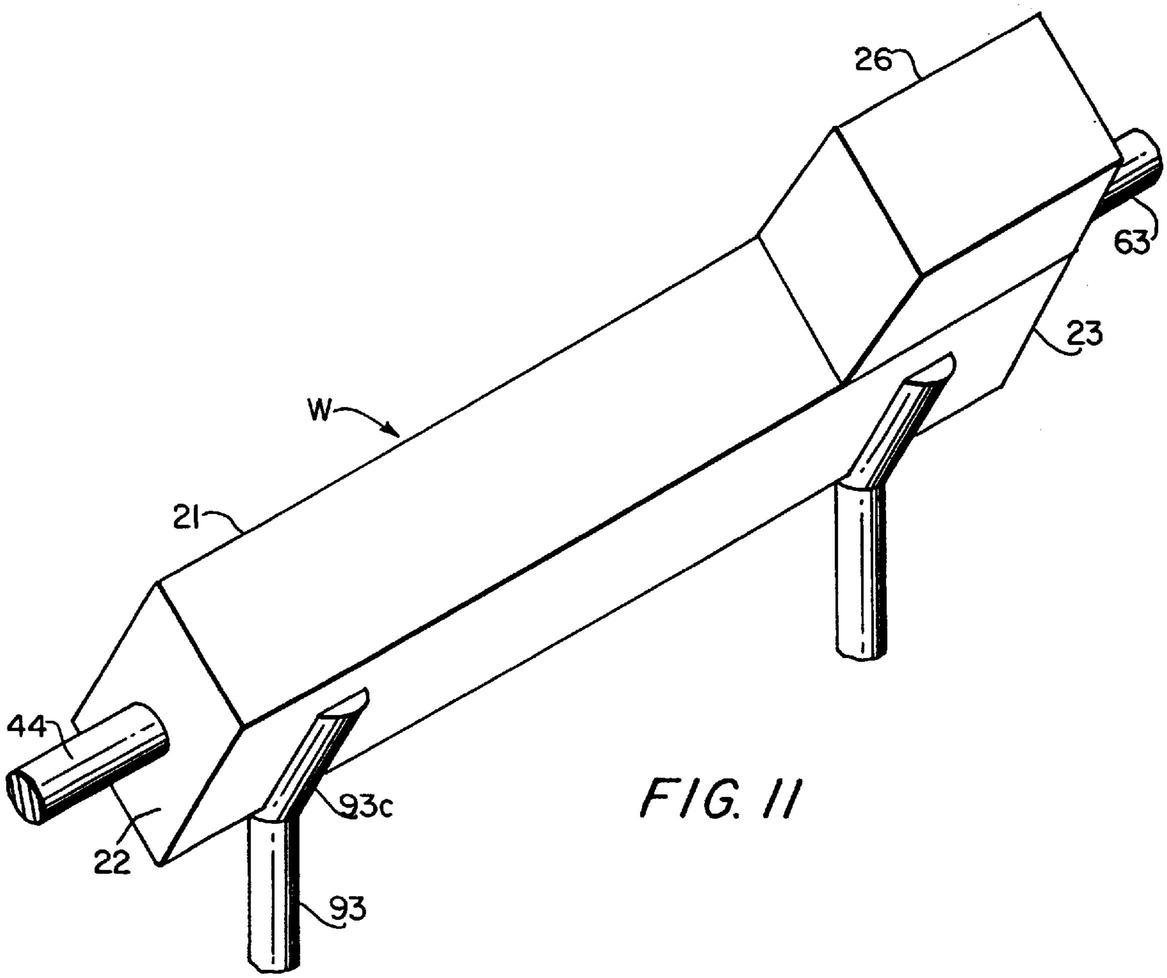
FIG. 11 is a perspective view of a workpiece illustrating the manner in which the workpiece is supported in the selected orientation by the support members of longitudinally aligned positioning means supported on the headstock and tailstock assemblies of the machine shown in FIG. 1.
Figure 12:
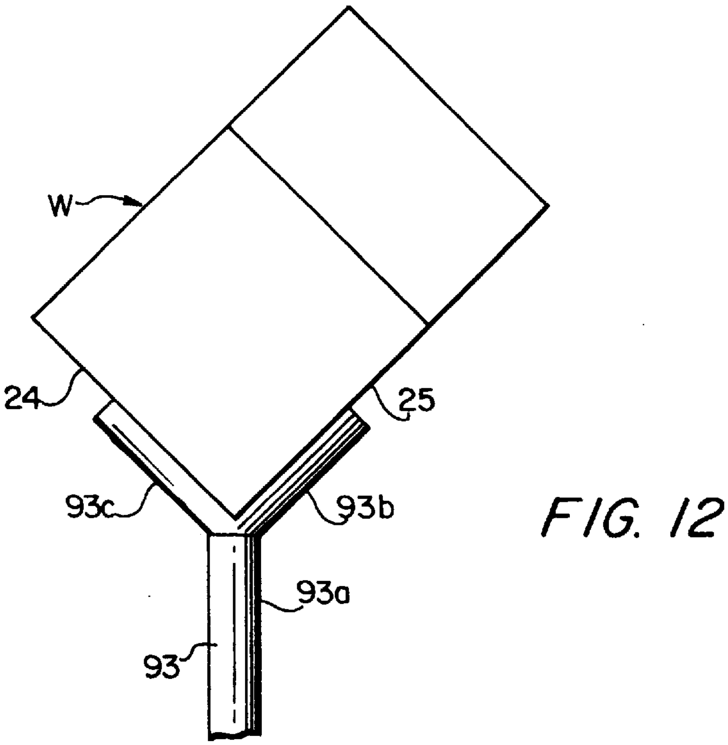
FIG. 12 is an enlarged end view of the workpiece illustrated in FIG. 11 illustrating a support member of a workpiece positioning assembly disposed in support relationship with the workpiece.

Referring to FIGS. 1 through 10 of the drawings, there is illustrated a machine 20 embodying the present invention which is operative to carve a workpiece of the type shown in FIGS. 11 and 12 to produce a chair, table or other leg component of a piece of furniture in accordance with a selected program inputted into a controller which functions to control the motions of a working tool of the machine. The workpiece generally consists of an elongated, rectangularly shaped main body portion 21 providing a pair of rectangularly shaped end surfaces 22 and 23 which may be engaged by a pair of support spindles along a longitudinal centerline of the workpiece in the conventional manner, and a pair of rectangularly shaped side surfaces 24 and 25 which serve as reference surfaces in positioning the workpiece on the machine. The piece includes an enlarged portion 26 at one end thereof providing additional material for forming an upper, enlarged portion of the final leg member to be formed of the workpiece. Each workpiece may consist of a solitary piece of wood or a piece made up of two or more pieces of wood glued together in the conventional manner. The pieces are rough cut on a band saw in the configuration as shown in FIGS. 11 and 12 to provide reference surfaces 24 and 25 angularly displaced 90° apart and with the enlarged section 26 formed at one end thereof. To properly execute the program for carving each of the workpieces, it is required that the centerline of each workpiece be disposed coaxially with the centerline of the axially aligned support spindles of the machine and the workpiece be disposed in a selected orientation determined by reference surfaces 24 and 25 of the workpiece being disposed on the support members of the positioning means of the machine.

Figure 1:
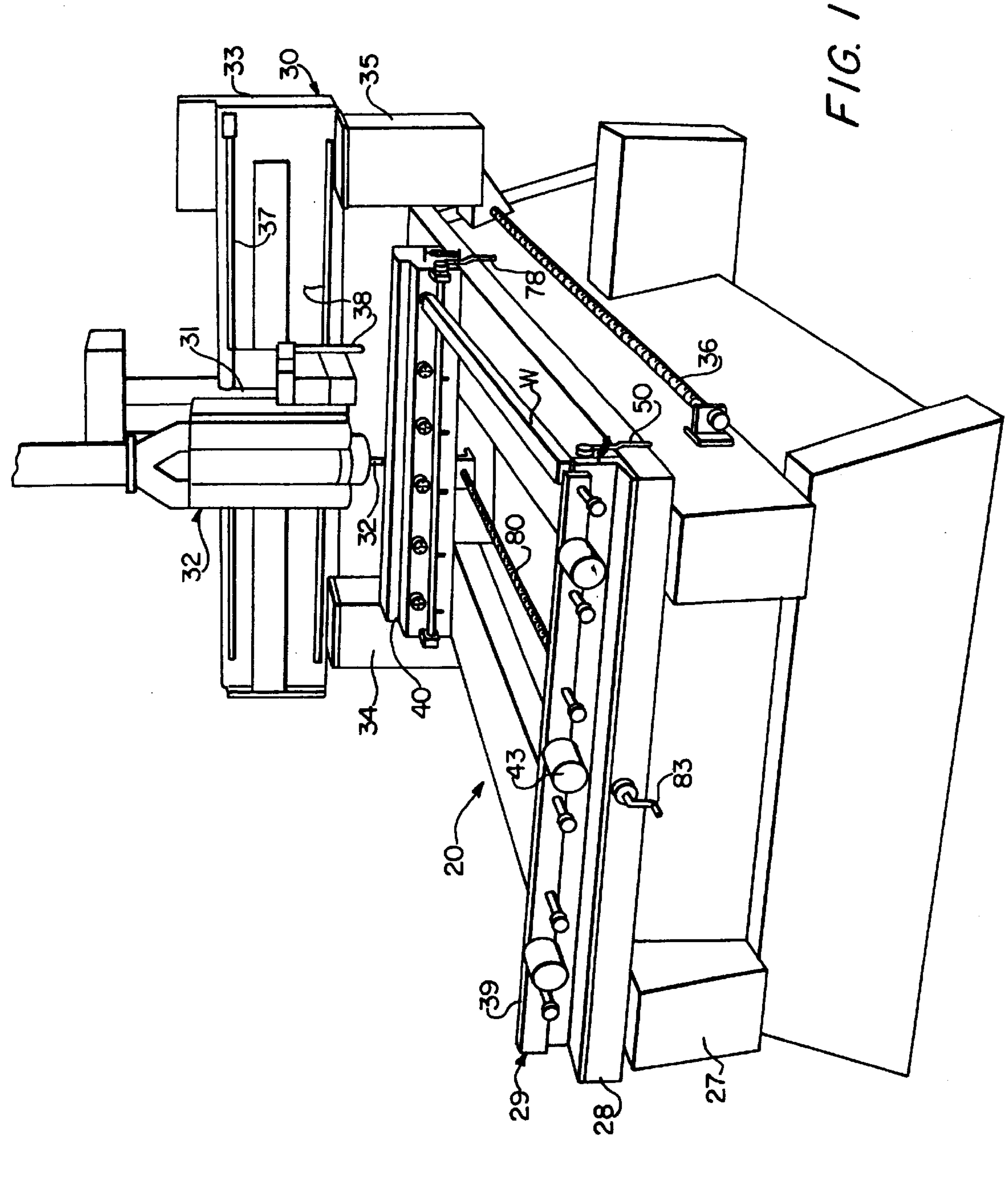
FIG. 1 is a perspective view of a carving machine embodying the present invention, provided with a stationary worktable and a movable gantry.

The machine as shown in FIG. 1 includes a base member 27 having a stationary worktable 28 mounted thereon, a workpiece retaining assembly 29 mounted on the worktable, a gantry 30 mounted on the base member and displaceable longitudinally or along an x-axis relative to the base member, a tool support assembly 31 mounted on the gantry and displaceably transversely or along a y-axis relative to the base member and a tool mounting assembly 32 mounted on the support assembly and displaceable vertically or along a z-axis.

The gantry member includes a transversely disposed portion 33 and a pair of depending portions 34 and 35 which are supported and displaceable along a pair of parallel rails mounted on the base member. The gantry member is displaced along the x-axis by a pair of feedscrews 36, 36 supported on opposite sides of the base member cooperating with nut assemblies on depending portions 34 and 35 and driven by servomotors operated by the controller. The transverse portion of the gantry member is provided with a pair of space, parallel rails 37 and 38 on which tool support assembly 31 is supported and along which the support assembly is displaced. Transverse portion 33 further is provided with a feedscrew which cooperates with a nut assembly on the support assembly for displacing the support assembly, and which also is driven by a servomotor operated by the controller. Tool mounting assembly 32 similarly is supported and displaceable vertically along a pair of transversely spaced guide rails. The tool mounting assembly also is provided with a feedscrew which cooperates with a nut assembly on the tool support assembly for displacing the tool mounting assembly vertically. Such feedscrew also is driven by a servomotor operated by the controller. The tool mounting assembly further is provided with a working tool 37, such as a routing bit, and a scanning probe 38 which is utilized to scan the configuration of a pattern piece for developing a file in the controller through the use of a teach method as will later be described.

Workpiece Retaining Assembly

Workpiece retaining assembly 29 is best illustrated in FIGS. 1 through 3 and 10. Generally, it consists of a tailstock assembly 39 rigidly mounted at one end of worktable 28 and a headstock assembly 40 supported on table 28 and displaceable relative to tailstock assembly 29 along the x-axis.

The tailstock assembly generally includes a transversely disposed stationary plate member 41, a transversely disposed movable plate member 42, a plurality of transversely spaced pneumatic cylinder assemblies 43 and a plurality of transversely spaced workpiece support spindles 44. Stationary plate member 41 has an angled shaped configuration including a base portion **41*a* rigidly secured to the worktable and an upstanding portion 41*b* provided with a plurality of transversely spaced guide openings 45 for receiving portions of support spindles 44 therethrough. The front base of upstanding portion 41*b* further is provided with a pair of transversely spaced pillow blocks 46 and 47 in which there is journaled a transversely disposed support bar 48 which supports a plurality of positioning assemblies 49 and may be pivoted about an axis thereof by means of a handle 50 to displace the positioning assemblies mounted on support bar 48** between upper operative positions and lower inoperative positions when the positioning assemblies are in operative conditions as will later be described.

Movable plate member 42 is spaced from and disposed parallel to upstanding portion **41*b* of stationary plate member 41. Each of pneumatic cylinder assemblies 43 includes a cylinder portion 43*a* rigidly secured to a rear side of movable plate member 42 and a rod portion 43*b* extending through an opening in plate member 42 and rigidly secured to upstanding portion 41*b* of the stationary plate member so that upon supplying air under pressure to either end of each of cylinder portions 43*a* of the cylinder assemblies, movable plate member 42 will be caused to displace along the x-axis relative to stationary plate member 41**.

Each of support spindles 44 extends through a guide opening 51 which is longitudinally aligned with a guide opening 45 in upstanding portion **41*b* of the stationary plate member. Each of such support spindles further is provided with an annular collar 52 disposed between the stationary and movable plate members, a coil spring 53 interposed between movable plate member 42 and collar 52, a set of bell spring washers 54 secured to a rearward face of collar 52 and engageable with a front face of movable plate member 42, an axially aligned pointed portion 55 disposed at the front end of the spindle and engageable with an end portion 22 of a workpiece loaded onto the machine and a knob portion 56 disposed at the outer, rear end of the spindle which may be grasped by the operator and pulled to retract the spindle relative to movable plate member 42 against the biasing action of coil spring 53**.

Figure 8:
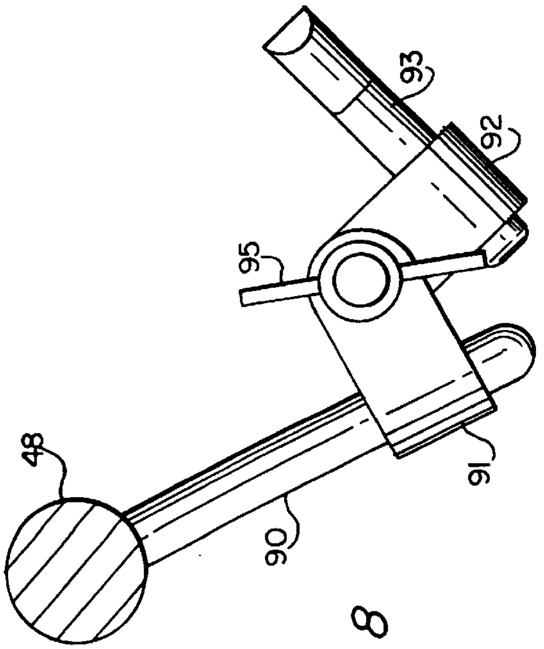
FIG. 8 is an enlarged, side elevational view of a workpiece positioning assembly shown in FIGS. 1 through 5.

FIGS. 7*a* through 7*d* illustrate the various positions which the stationary and movable plate member and spindles may assume relative to each other. FIG. 8 illustrates the condition of such components when air under pressure is not supplied to either end of cylinder portions 43*a* of the cylinder assemblies. Under such circumstances, coil springs 53 will be caused to expand correspondingly causing collar portion 52 to engage upstanding portion 41*b* of the stationary plate member, support spindle 44 to be in its furthest extended position and knob portion 56 engaging the movable plate member. When it is desired to load a workpiece onto the machine, knob portion 56 may be grasped by the operator and retracted to a position as shown in FIG. 7*b* in which the support spindle becomes fully retracted and collar portion 52 causes coil spring 53 to contract until bell spring washers 54 engage the front face of movable plate member 52. With support spindle 44 thus fully retracted, a workpiece may be loaded onto the machine without any interference by the support spindle. Once the support piece is in position, knob portion 56 may be released, causing coil spring 53 to extend, displacing support spindle 44 forwardly so that end portion 55 engages the end face of the workpiece with a compressive force to hold the workpiece in position. The support spindle under such conditions will be in the position as shown in FIG. 7*c*.

To firmly engage and thus clamp the workpiece in an operative condition between the headstock and tailstock assemblies, air under pressure is supplied to the base ends of cylinder portions 43*a* causing movable plate member 42 to displace forwardly toward stationary plate member 41 thus causing collar portion 52 to engage stationary plate member 41, movable plate member 42 to engage and compress bell spring washers 54 and support spindle 44 to extend to its maximum position as shown in FIG. 7*d* to firmly engage the end of the workpiece. To retain the support spindle in the fully retracted position as shown in FIG. 7*b*, a lockout block pivotally connected to the rear face of the moving plate member can be provided which may be pivoted upwardly or downwardly to a position between knob portion 56 and the rear face of the moving plate member thus maintaining coil spring 53 in its compressed condition. Such block member further may be provided with a notch adapted to receive a rear portion of the support spindle therein. In the use of such a lockout block, the operator then would grasp the knob of the spindle with one hand and retract it against the biasing action of coil spring 53, the lockout block would be grasped by the other hand and swung into position between the knob portion 56 and the movable plate member and held in such position until the knob was released to permit the coil spring to advance the knob portion of the spindle against the lockout block member.

The function of coil spring 53 is merely to provide a sufficient force to enable the end of a workpiece to be retained for orientation purposes without having to be held by the operator. The function of the bell spring washer assembly is to provide a suitable biasing action against the end of the workpiece when air under pressure is supplied to the base ends of the cylinder assemblies to clamp the workpieces between the headstock and tailstock assemblies. Accordingly, it will be appreciated that the spring rate of each of the bell spring washer assemblies is greater than the spring rate of each of the associated coil springs.

Figure 2:
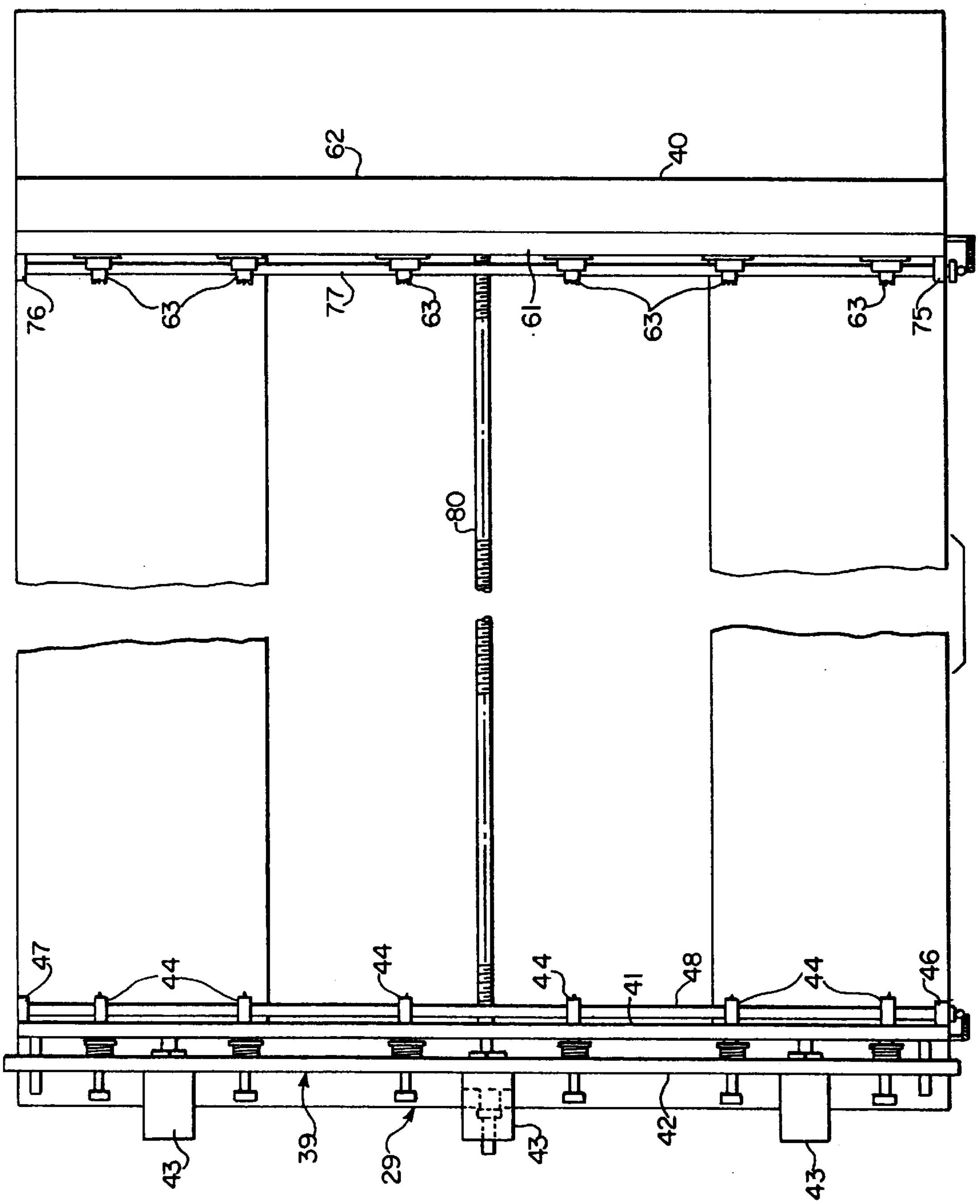
FIG. 2 is an enlarged, top plan view of the workpiece retaining assembly of the machine shown in FIG. 2, having a portion thereof broken away.
Figure 3:
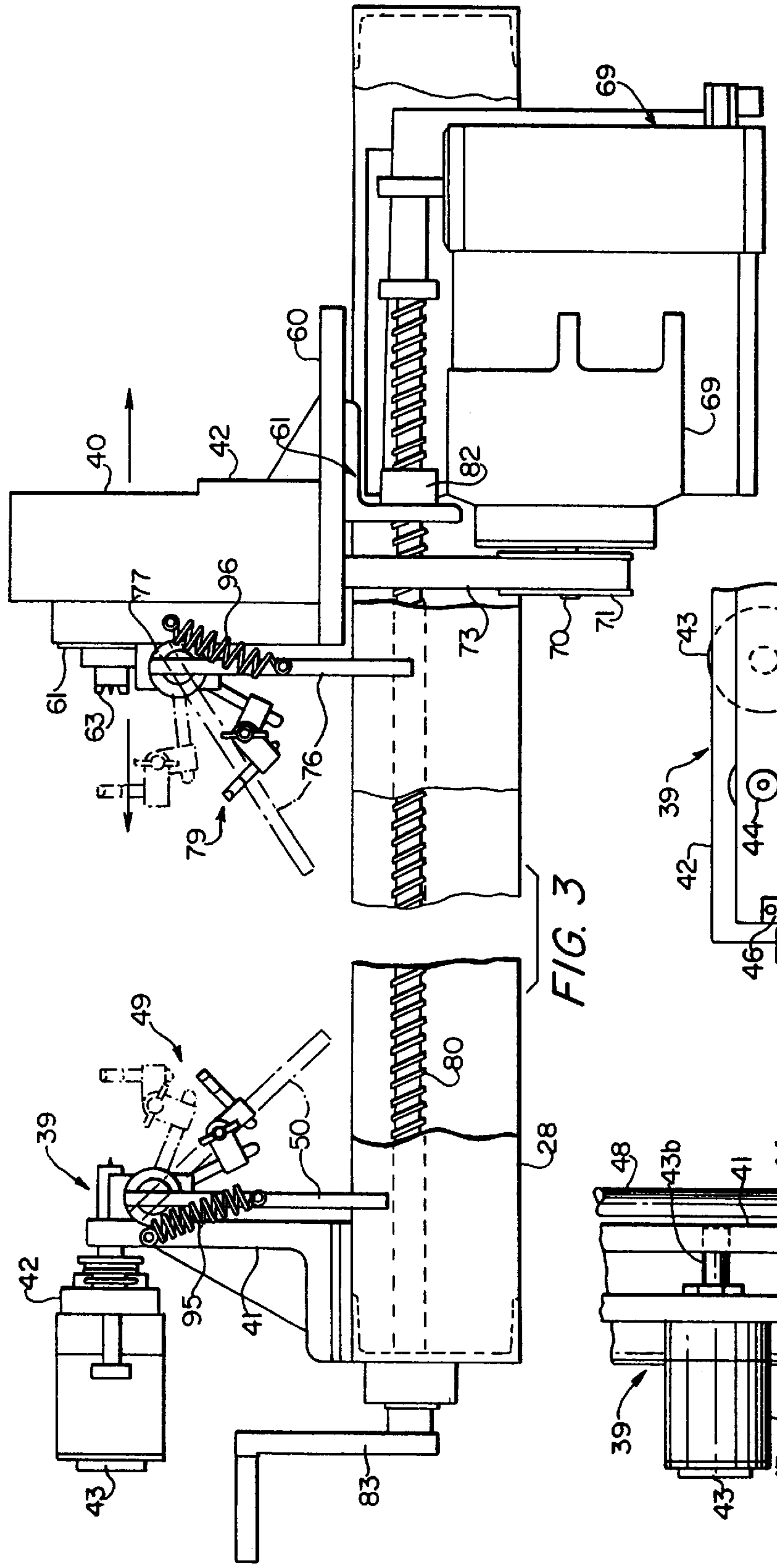
FIG. 3 is an enlarged, side elevational view of the workpiece retaining assembly shown in FIGS. 1 and 2, illustrating each of the workpiece positioning assemblies thereof in its operative condition, each in an operative position in phantom lines and each in inoperative positions in solid lines, and having a portion thereof broken away.
Figure 5:
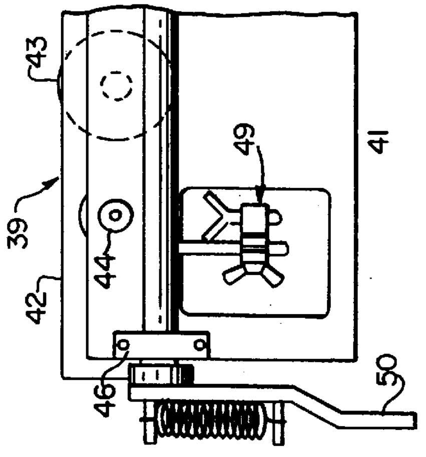
FIG. 5 is a front elevational view of the tailstock assembly, shown in FIG. 4, having a portion thereof broken away.
Figure 4:
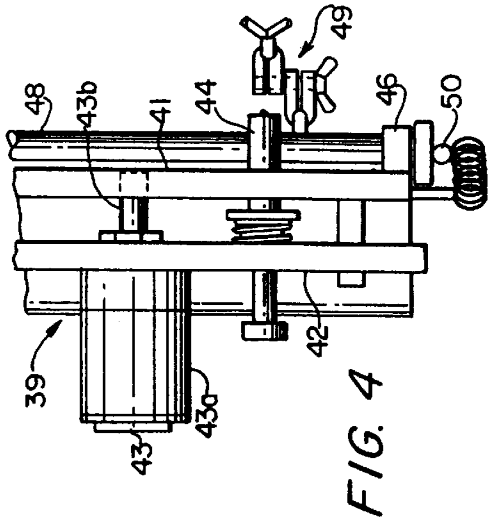
FIG. 4 is a top plan view of the tailstock assembly shown in FIGS. 1 through 3, having a portion thereof broken away.

As best seen in FIGS. 2, 3 and 10, headstock assembly 40 includes a base plate member 60 supported and displaceable longitudinally on a pair of guide rails provided on the worktable, a support plate member 61 mounted on and rigidly secured to base plate member 60 at a forward end thereof and a gear housing 62 also mounted on and rigidly secured to base member 60 adjacent support member 61. Journaled in openings provided in support member 61 is a plurality of support spindles 63 each of which is disposed in longitudinal alignment with a support spindle 44 of tailstock assembly 39 for clamping a workpiece therebetween and rotationally indexing the workpiece while in the clamped condition. As shown in FIG. 10, each of support spindles 63 is provided with an outer, pointed end portion 64 which is adapted to engage and penetrate an end surface 23 of a workpiece to firmly engage it and thus permit rotational indexing of the workpiece about its longitudinal axis, and an inner portion extending into gear housing 40 and being provided with a driven gear 65. Also mounted on support member 61 and extending rearwardly into gear housing 62 is a support shaft 66 disposed between and parallel to a pair of support spindles 63. An idler gear 67 is mounted on each shaft 66 and is disposed in the same vertical plane as driven gears 65.

Depending from and rigidly secured to base member 60 is a carriage assembly 68 on which there is mounted an electric indexing motor 69. The motor is provided with an output shaft 70 having a drive pulley 71 disposed below and in the same vertical plane as a driven pulley 72 mounted on the centermost support spindle 63. Rotary indexing motion of motor 69 is transmitted through drive pulley 71, a drive belt 73 trained around drive pulley 71 and driven pulley 72, gear 65 mounted on the centermost support spindle 63 and a drive chain 74 trained about driven gears 65 and idler gears 67. Indexing motor 69 is operated by the controller of the machine to periodically rotationally index the workpieces clamped between the headstock and tailstock assemblies of the retaining assembly in accordance with the program inputted into the controller.

As best seen in FIG. 2, a pair of pillow blocks 75 and 76 similar to and longitudinally aligned with pillow blocks 46 and 47, respectively, are mounted on the outer face of support plate member 61, in which there is journaled a support bar 77 comparable to support bar 48 mounted on the tailstock assembly, which may be rotated about its transversely disposed axis by means of a handle 78. Similarly mounted on support bar 77 is a plurality of transversely spaced workpiece positioning assemblies 79 each of which is disposed in longitudinal alignment with a workpiece support assembly 49 and which operates in essentially the same manner thereto. Each of positioning assemblies 79 may be displaced an operative position as shown by phantom lines in FIG. 3 and an inoperative position as shown by solid lines in FIG. 3, when in an operative condition, by means of operating handle 78.

Headstock assembly 40 is displaced longitudinally along the x-axis relative to tailstock assembly 39 by means of a feedscrew 80 disposed along the longitudinal centerline of the retaining assembly, below the headstock and tailstock assemblies, and journaled at its ends in crosspiece members of the worktable. As best shown in FIG. 3, base member 60 of the headstock assembly is provided with a depending bracket 81 having a follower nut 82 through which feedscrew 80 is threaded. A free end portion of the feedscrew disposed adjacent the tailstock assembly is provided with a hand crank 83 which may be operated to rotate the feedscrew and thus cause the headstock assembly to displace longitudinally relative to the tailstock assembly in the conventional manner.

Workpiece Positioning Assemblies

Workpiece positioning assemblies 49 and 79 are substantially similar in construction and operation. As best shown in FIGS. 8 and 9, each assembly 49 consists of a linkage or swivel assembly including a base pin member 90, a first U-shaped member 91, a second U-shaped member 92, a workpiece support member 93, a threaded bolt 94 and a wing nut 95. Each base pin member 90 is rigidly connected to bar member 48 and is disposed substantially radially relative to the centerline thereof. Each U-shaped member 91 includes a base portion 91*a* and a pair of leg portions 91*b* and 91*c*. The lower end of the space between leg portions is enlarged, providing a cylindrical opening for receiving the end of base pin member 90 therein. The outer ends of leg members 91*b* and 91*c* are provided with axially aligned openings for receiving bolt 94 therethrough. Second U-shaped member 92 is similar in construction to U-shaped member 91 including a base portion 92*a* and a pair of leg portions 92*b* and 92*c*. The lower end of the separation between the leg portions thereof similarly is formed with an enlarged cylindrical opening and the free ends of leg portions 92*b* and 92*c* are provided with axially aligned openings for also receiving bolt 92 therethrough. Workpiece support member 93 has a substantially Y-shaped configuration including a pin portion 93*a* having a free end thereof received within the enlarged cylindrical opening in U-shaped member 92 and a pair or arm portions 93*b* and 93*c* providing a pair of seating surfaces 93*d* and 93*e* angularly displaced 90° apart on which workpiece surfaces 24 and 25 are adapted to be seated when a pair of longitudinally aligned positioning assemblies on the headstock and tailstock assemblies are in an operative condition and disposed in operative positions as illustrated in FIGS. 11 and 12. Bolt 94 is of a conventional type having a shank portion with a sufficient length to extend through the aligned openings in the leg portions of a pair of U-shaped members 91 and 92 placed in side by side relation as shown in FIG. 9, and a head portion which is engageable with the outer side of leg portion 92*c* of member 92. Wing nut 95 also is of a conventional type which may be threaded onto the exposed end of bolt 94 and tightened to bear against leg portion 91*b* to draw the leg portions of members 91 and 92 together to thereby fix the interrelationship of the components of assembly 49 in an operative condition.

When wing nut 95 is loosened to remove the clamping force between the wing nut and the head of bolt 94, each of the components of assembly 49 is free to angularly displace relative to adjoining components. U-shaped member 91 is free to pivotally displace relative to the axis of base pin member 90, U-shaped member 92 is free to pivotally displace relative to U-shaped member 91 about the axis of bolt 94 and support member 93 is free to pivotally displace relative to U-shaped member 92 about the axis of pin portion 93*a*. Accordingly, it will be appreciated that when an initial one of a sequential number of workpieces having a configuration of the workpiece shown in FIGS. 11 and 12 are loaded onto the machine and clamped between the headstock and tailstock assemblies thereof, wing nut 95 of positioning assembly 94 is backed off to allow the components thereof to displace relative to each other about the previously mentioned axes, and handle 50 is pivoted upwardly to the position as shown in phantom lines in FIG. 3, workpiece support member 93 of the assembly may be manually grasped by the operator and positioned under the workpiece loaded on the machine so that seating surfaces 93*d* and 93*e* of the support member engage side surfaces 24 and 25 of the workpiece to establish the operative condition of the positioning assembly. With support member 93 thus held against the underside of the workpiece with one hand, the operator may then tighten wing nut 95 to fix the interrelationship of the components of the positioning assembly in an operative condition.

With handle 50 in the pivotally upward position as shown by the phantom lines in FIG. 3, the positioning assembly also will be in the operative, workpiece supporting position. Upon pivoting handle 50 downwardly to the position shown by the solid lines in FIG. 3, the positioning assembly in the operative condition will be moved to an inoperative position. To retain the positioning assembly in either the operative or inoperative position when in the operative condition, an over-the-center spring 95 is provided interconnecting handle 50 at a point between the ends thereof and an end portion of stationary plate member 41.

Each of positioning assemblies 49 and 79 are constructed similar to and operate in substantially the same manner as the assembly as described. Each may be placed in an inoperative condition by loosening the wing nut thereof and allowing the components thereof to displace relative to each other, and each may be manipulated manually to position the workpiece support member thereof into engagement with a workpiece and the wing nut may be tightened to fix the interrelationship of the components thereof and thus place the assembly in an inoperative condition. In addition, handles 50 and 79 may be pivoted to displace such assemblies between operative and inoperative positions when the assemblies are in the operative condition as described. As with handle 50, handle 75 is provided with an over the center spring 96 interconnecting handle 78 at a point between the ends thereof and a side portion of support plate member 61.

Operation

In the operation of the machine as described, with the gantry and tool mounting assembly on the gantry positioned at the "home" position, the headstock assembly displaced from the tailstock assembly to permit the mounting of a pattern piece, and each of the positioning assemblies in their collapsed or inoperative conditions and retracted to inoperative positions, the controller of the machine is operated to allow the placement of a pattern piece between the headstock and tailstock assemblies and allow probe 38 to move along the x and z axes while the pattern piece is rotationally indexed intermittently to allow the probe to scan the pattern piece and record the positions in a file within the controller to produce a program which may be replayed with the use of a cutting tool such as a router bit to carve and thus replicate the configuration of the pattern piece on a subsequent rough cut workpiece, utilizing the well-known "teach through" programming method. Such scanning procedure would be repeated first with a probe stylus having an identical configuration of a rough cutting tool and then with a second probe stylus having a configuration of a fine cutting tool.

With the machine thus programmed and each of the positioning assemblies in its collapsed or inoperative condition and inoperative position, each of support spindles 44 in the position as shown in FIG. 7*a* is retracted to the position as shown in FIG. 7*b*, a workpiece having a configuration as shown in FIGS. 11 and 12 is positioned between a retracted support spindle 44 and a longitudinally aligned spindle 63 and the support spindle is released to permit it to extend to the position as shown in FIG. 7*c*, causing the pair of longitudinally aligned spindles to engage and retain the workpiece preliminarily clamped between the headstock and tailstock assemblies. With the workpiece thus positioned and workpiece surfaces 24 and 25 facing downwardly, handle 50 is pivoted upwardly and each of support members 93 is moved upwardly so that seating surfaces 93*d* and 93*e* engage downwardly facing surfaces 94 and 95 of the workpiece as shown in FIG. 12. With each support member 93 held in such position, wing nut 95 is tightened to fix the interrelationship of each of the positioning assemblies and thus place each of the assemblies in an operative condition.

Once a workpiece thus has been placed and temporarily retained between a pair of longitudinally aligned spindles and each of positioning assemblies 93 have been positioned and fixed in their operation condition, each of positioning assemblies 79 are similarly positioned up against downwardly facing sides 24 and 25 of the workpieces retained between the headstock and tailstock assemblies and fixed in their operative conditions. With each of the positioning assemblies thus placed in its operative condition, the controller functions to operate the cylinder assemblies causing air under pressure to be supplied to the base ends of cylinder portions 43*a* to correspondingly cause movable plate member 42 to displace forwardly and exert a force through the bell spring washers, and support spindles 44 to advance and thus firmly engage the ends of the workpieces to firmly clamp them between the headstock and tailstock assemblies.

Handles 80 and 78 are then pivoted downwardly by the operator to the positions shown by the solid lines in FIG. 3 to free the workpieces and thus allow the carving operation to begin. The controller then functions to operate the servomotors for the drive screws of the gantry, the tool support assembly and tool mounting assembly and indexing motor 69 to displace cutting tool 37 through a sequence of motions in accordance with the stored program previously established through the use of the teach through method to carve the workpieces and thus provide finished carved workpieces having configurations replicating the configuration of the pattern piece.

When the carving operation on the first set of workpieces has been completed, the controller will function to operate the cylinder assemblies and thus cause movable plate member 42 to displace outwardly relative to stationary plate 41 to a position as shown in FIG. 7*c*. The finished workpieces may then be removed by the operator merely by grasping one of the workpieces with one hand, grasping the knob of the support spindle 44 and retracting it against the action of coil spring 53 to the position shown in FIG. 7*b* while continuing to hold and support the workpiece with the other hand and then setting the finished workpiece aside.

After each of the finished workpieces are thus removed from the machine, a next set of workpieces may be loaded onto the machine for a similar carving operation by pivoting handles 50 and 78 upwardly to position the positioning assemblies in their operating positions as shown in phantom lines in FIG. 3, retracting each support spindle 44 to the position shown in 7*b* to allow the placement of a next workpiece on the seating surfaces of the support members of each set of longitudinally aligned positioning assemblies, releasing each support spindle when each workpiece is seated on a set of positioning assemblies so that the support spindle advances to the position as shown in FIG. 7*c* to initially engage and thus clamp each workpiece between the headstock and tailstock assemblies and then pivoting handles 50 and 78 downwardly to displace each of the positioning assemblies from its operative position to its inoperative position and thus free the new set of workpieces in the same selected orientations of the previous set of workpieces, ready for the next carving cycle. The controller then functions to cause the workpieces to be firmly clamped between the headstock and the tailstock assemblies and the various servomotors to operate to again guide the cutting tool in the same programmed sequence of motions coordinated with the workpiece indexing means for carving the workpieces each in the selected configuration.

Although the embodiment as described provides for the machining of similarly configured workpieces having a pair of reference surfaces angularly displaced 90° apart and similarly configured seating surfaces on the support members of the positioning assemblies, it is to be understood that other forms of reference surfaces on the workpieces and conforming surfaces of the support members of the positioning assemblies may be used, requiring only that the reference surfaces selected cooperate with the program inputted and into the controller to provide the production of configured workpieces consistently replicating the configuration of the original pattern piece. Furthermore, although a pair of longitudinally aligned positioning assemblies have been described for positioning a workpiece in the selected orientation of the workpiece, it is contemplated within the scope of the invention that simply a single of such positioning assemblies may be used to position each workpiece.

Figure 13:
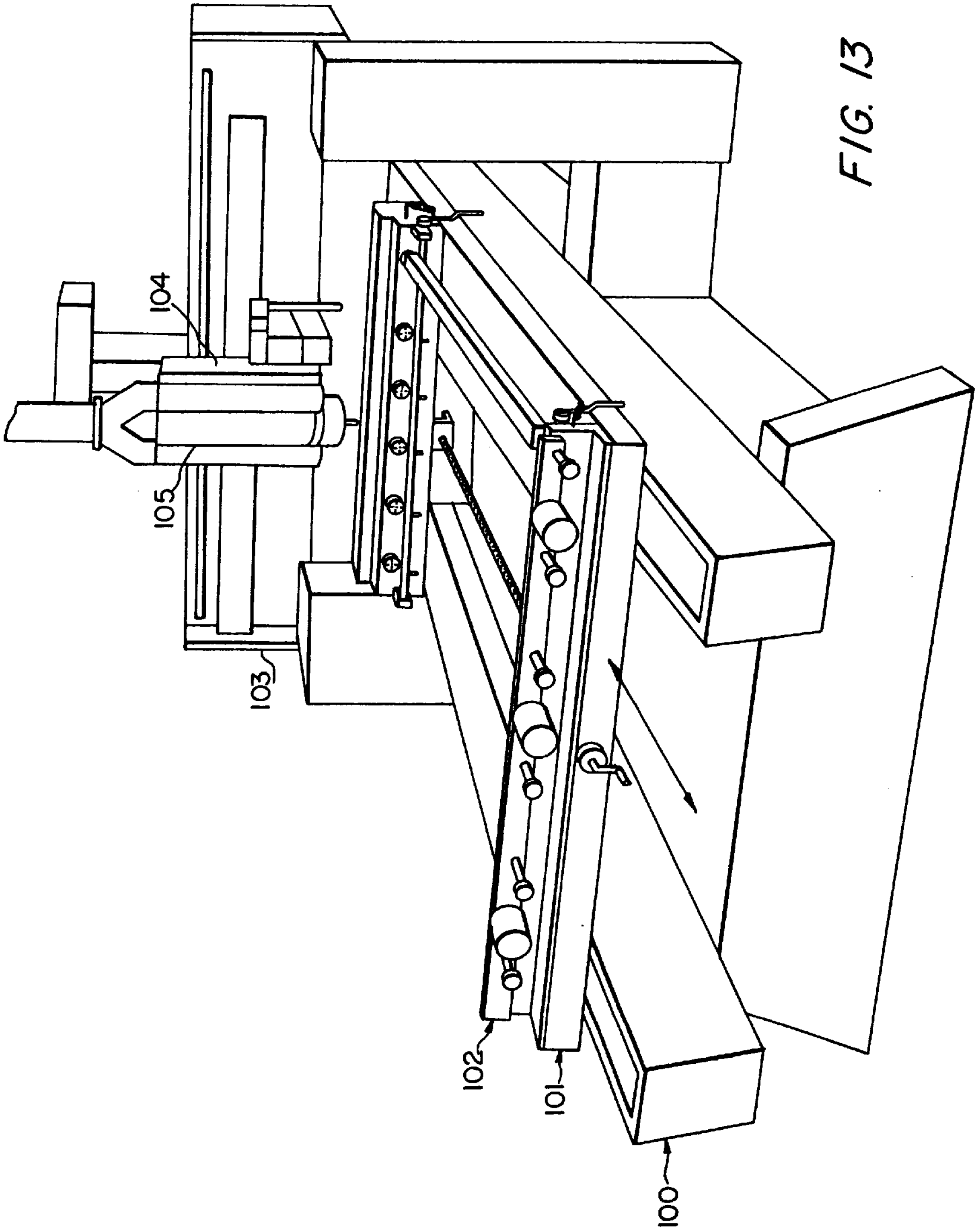
FIG. 13 is a perspective view of a machine similar to the machine shown in FIG. 1 with the exception of being provided with a movable table supporting the workpiece retaining means which is displaceable along the x-axis, and a stationary gantry supporting a tool assembly displaceable transversely or along the y-axis, having a working tool assembly displaceable vertically or along the z-axis.

It further is contemplated that in lieu of a machine having a stationary worktable supporting a workpiece retaining assembly as described and a movable gantry, a machine with a movable worktable supporting a workpiece retaining assembly as described and a stationary gantry may be used within the scope of the invention. Such a machine is illustrated in FIG. 13. It includes a base member 100, a worktable 101 mounted on the base member and displaceable on guide rails longitudinally or along an x-axis, a workpiece retaining assembly 102 comparable to workpiece retaining assembly 29 with headstock and tailstock assemblies comparable to headstock and tailstock assemblies 39 and 40, respectively, and workpiece positioning assemblies comparable to workpiece positioning assemblies 49 and 78, mounted on the movable table, a stationary gantry 103, a tool support assembly 104 comparable to tool support assembly 31 and a tool mounting assembly 105 comparable to toolhead assembly 32. The machine illustrated in FIG. 13 operates in substantially the same manner as the machine shown in FIG. 1 except that the moving table and correspondingly the workpiece is displaced along the x-axis instead of the working tool which remains stationary with respect to any displacement along the x-axis.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof as limited solely by the appended claims.

I claim:

1. A tailstock assembly mountable on a machine tool and cooperable with a headstock assembly for retaining a workpiece therebetween comprising:

a first plate member supportable on a base member of said machine;

a second plate member displaceable relative to said first plate member;

means for displacing said second plate member relative to said first plate member; and at least one support spindle mounted on said second plate member having an end portion displaceable with said second plate member into and out of engagement with an end portion of a workpiece disposed between said headstock and tailstock assemblies.

2. A tailstock assembly according to claim 1 wherein said displacing means for said second plate member comprises a fluid actuated cylinder assembly having a cylinder portion rigidly secured to said second plate member and a rod portion rigidly secured to said first plate member.

3. A tailstock assembly according to claim 1 wherein said support spindle extends through a guide opening in said first plate member.

4. A tailstock assembly according to claim 1 wherein said spindle is provided with a collar and a coil spring interposed between said collar and said second plate member.

5. A tailstock assembly according to claim 1 wherein said spindle is provided with a collar, a first spring interposed between said collar and said second plate member and a second spring engaging said collar and engageable by said second plate member when said second plate member is displaced relative to said first plate member, and wherein said second spring has a greater spring rate than said first spring.

6. A tailstock assembly according to claim 1 including at least one means for successively positioning a plurality of similarly configured workpieces in a selected orientation including a support member, a jointed linkage supported on said first plate member, supporting said support member and manipulatable to position said support member into a support relationship with an initial one of said workpieces disposed in said selected orientation, means for fixing the interrelationship of the components of said linkage when said support member is positioned in said support relationship with said initial workpiece to place said positioning means in an operative condition and means for displacing said positioning means when in said operative condition between an operative position for supporting a sequential one of said workpieces in said selected orientation and in inoperative position.

7. A tailstock assembly according to claim 6 wherein said support member is provided with a pair of angularly displaced surfaces on which said workpiece may be supported.

8. A tailstock assembly according to claim 6 wherein said surfaces are disposed 90° apart for seating comparably angularly displaces surfaces of said workpiece.

9. A tailstock assembly according to claim 6 wherein said linkage comprises a swivel assembly.

10. A tailstock assembly according to claim 9 wherein said swivel assembly is operable to angularly displace said support member about three separate axes.

11. A tailstock assembly according to claim 9 wherein said means for fixing the interrelationship of the components of said swivel assembly comprises a nut and bolt arrangement.

12. A tailstock assembly according to claim 6 wherein said workpiece positioning means includes a bar journaled on said first plate member, having a handle for pivoting said bar about a longitudinal axis thereof to displace said workpiece positioning means between said operative and inoperative positions.

13. A tailstock assembly according to claim 12 including an over the center spring interconnecting said handle and said first plate member.

14. A tailstock assembly according to claim 1 wherein said workpiece positioning means includes:

a first U-shaped member, having a pin supported on said first plate member, received between leg portions thereof;

a second U-shaped member, having a pin portion of said support member received between leg portions thereof; and a threaded bolt extending through aligned openings in the leg portions of said U-shaped members, provided with a nut threaded onto an end of said bolt which may be brought to bear against an adjacent leg portion of one of said U-shaped members to draw the leg portions of said U-shaped members together to fix the interrelationship of said U-shaped members and said pins.

* * * * *